United States Patent
Schneider et al.

(10) Patent No.: US 6,860,018 B2
(45) Date of Patent: Mar. 1, 2005

(54) SHEAR-LOCKING DEVICE

(75) Inventors: Manfred Schneider, Bubach (DE); Gerhard Staudt, Schmelz (DE)

(73) Assignee: Wolf-Garten GmbH & Co. KG (DE)

( * ) Notice: Subject to any disclaimer, the term of this patent is extended or adjusted under 35 U.S.C. 154(b) by 0 days.

(21) Appl. No.: 10/386,801

(22) Filed: Mar. 11, 2003

(65) Prior Publication Data

US 2003/0163923 A1 Sep. 4, 2003

Related U.S. Application Data

(63) Continuation of application No. 09/674,400, filed as application No. PCT/EP99/04523 on Jun. 30, 1999, now abandoned.

(30) Foreign Application Priority Data

Jul. 22, 1998 (DE) .......................................... 198 32 896

(51) Int. Cl.[7] .............................................. B26B 13/00
(52) U.S. Cl. .............................. 30/262; 30/254; 30/252
(58) Field of Search .......................... 30/262, 254, 160, 30/161, 340, 341, 342, 343, 344, 186

(56) References Cited

U.S. PATENT DOCUMENTS

| | | | | | |
|---|---|---|---|---|---|
| 2,396,583 A | * | 3/1946 | Lenk et al. | .................... | 30/262 |
| 2,638,669 A | * | 5/1953 | Steede | ......................... | 30/262 |
| 2,715,270 A | * | 8/1955 | Oxhandler | ................... | 30/262 |
| 3,775,846 A | * | 12/1973 | Johnson | ....................... | 30/262 |
| 4,073,059 A | * | 2/1978 | Wallace et al. | ............... | 30/262 |
| 5,263,254 A | * | 11/1993 | Orthey | ......................... | 30/262 |
| 5,367,774 A | * | 11/1994 | Labarre et al. | ............... | 30/262 |
| 5,774,991 A | * | 7/1998 | Shi | ............................. | 30/262 |

FOREIGN PATENT DOCUMENTS

| | | | | | |
|---|---|---|---|---|---|
| AU | 250813 A | * | 4/1964 | ................... | 30/262 |
| CA | 612104 A | * | 1/1961 | ................... | 30/262 |
| DE | 1242038 A | * | 6/1965 | ................... | 30/262 |
| DE | 8525568.8 | | 10/1986 | | |
| DE | 9110672.9 | | 11/1991 | | |
| DE | 9110772.5 | | 11/1991 | | |
| GB | 1543657 | | 4/1979 | | |
| GB | 2030502 A | * | 4/1980 | ................... | 30/262 |
| GB | 2210821 | | 6/1989 | | |

* cited by examiner

Primary Examiner—Allan N. Shoap
Assistant Examiner—Thomas J Druan, Jr.
(74) Attorney, Agent, or Firm—Ostrolenk, Faber, Gerb & Soffen, LLP

(57) ABSTRACT

Shears having a locking mechanism which ensures self-locking closure without any light gap. A tumbler (24) on one limb of the shears pivoted by a slide button (22) has a cam surface (34) interacting in a self-locking manner with a catch groove (28) on a cam surface (32) on the other limb (14). The catch groove (28) can have a larger configuration in the direction of closure. An arched cam surface may also be provided, which is eccentrically located in relation to the pivoting axis of the tumbler. A fine locking device (50) for the slide button may be provided so the slide button can be fixed in different closed positions to prevent unintentional closure in the open position.

10 Claims, 5 Drawing Sheets

48 — LATCHING SLEEVES WITH LATCHING STRUCTURE (GROOVES)

DEFINED LATCHING POSITIONS

SHEAR-LOCKING DEVICE

CROSS REFERENCE TO RELATED APPLICATIONS

Figure 1:
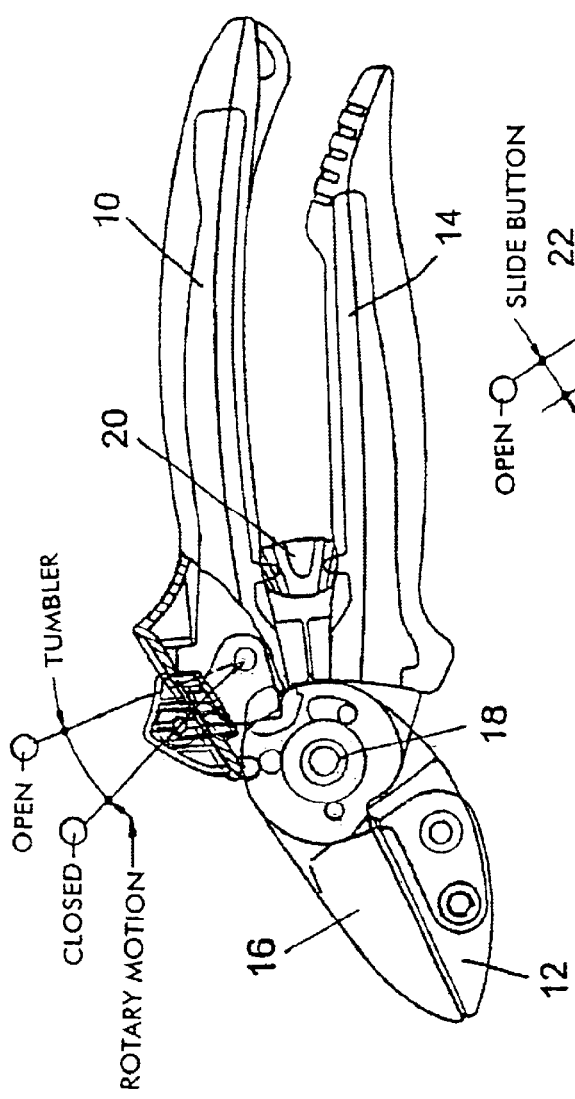

This is a continuation of U.S. patent application Ser. No. 09/674,400, filed Oct. 31, 2000 now abandoned, in the names of Manfred Schneider and Gerhard Staudt and entitled SHEAR-LOCKING DEVICE, now abandoned, which is the National stage of International application No. PCT/EP99/04523, filed Jun. 30, 1999.

BACKGROUND OF THE INVENTION

The invention relates to pruning shears having a locking device including manually actuated slide button and a tumbler which is actuated by the latter and locks the limbs of the shears in the closed position against the force of an opening spring.

SUMMARY OF THE INVENTION

Locking devices of this kind are generally used to protect the shears from being opened unintentionally when not in use and to a large extent avoiding any risk of injury. The smaller space requirements when they are closed makes them easier to handle, store and transport. The locked position is at the same time the standby position, in which the handles of the shears can be grasped comfortably with one hand so that the shears can be held ready for cutting once the interlock has been released, which it should be possible to do with the same hand.

These requirements are generally met if the two tips of the limbs of the shears rest against one another in the closed state and the handle shells can be gripped comfortably with one hand.

However, the requirements to be met by modern pruning shears with regard to the locking device are further-reaching. In the case of an anvil shears, in which the cutting edge of a cutting blade interacts with an anvil on the other limb of the shears, there is the requirement that the cutting edge should rest against the anvil without a light gap. Tolerance variations during manufacture and wear on the shears which occurs during use often lead to the appearance of a parallel or wedge-shaped light gap in the closed position and, although this does not necessarily impair the cutting performance of the shears, it is often regarded as a defect by the user.

The prior art includes provision for adjustment of the position of the anvil relative to the cutting edge during the process of manufacture or any repair which may be made. However, this means that the shears have to be closed somewhat more or less to ensure that the blade and the anvil are in contact over their entire length. The customary shear-locking devices with tumblers which are fixed in a very specific latching position cannot guarantee closure without a light gap in the manner described.

Although this problem of "avoiding a light gap" does not arise with twin-bladed shears, unwanted play can arise even in these if the dimensional tolerances in the buffers of the shears are too large or if said buffers cannot deflect to a sufficient extent (due to tolerance scatter in the SHORE hardness).

Although the problems mentioned occur primarily with pruning shears, they can also arise with shears of other kinds which are moved into the open position by spring force, and the invention is therefore also intended to include shears of a different but comparable type.

DE 11 06 72 U discloses a locking device of the generic type for pruning shears. Here, an actuating member and the tumbler have arranged between them a connecting element, the direction of action of which deviates from a direction of actuation of the actuating member and/or the tumbler. The intention is thereby to ensure easy operation by virtue of ergonomically advantageous arrangement of an operating element. Tolerance compensation and readjustment in the event of wear are not provided here, however.

The object of the invention is to provide shears having a shear-locking device which guarantees complete closure even after prolonged use.

The object is achieved in pruning shears or the like comprised of first and second crossed pivoted limbs 14 which carry cooperating cutting elements at the front ends thereof, and which extend rearwardly to form hand grips for operating the shears, and an opening spring that cooperates with the limbs to apply a force tending to open the shears, by providing a locking device comprising a manually operable slide button, a tumbler which is pivotally mounted on the first limb, and which is coupled to be moved by the slide button in a first direction to lock the shears in a closed position against the force of the spring with no gap between the cutting elements, and in a second direction to a released position at which the shears may be manually opened and closed. The locking device further includes a cam surface on the tumbler, and a latching cam surface on the second limb that interacts with the cam surface on the tumbler, the two cam surfaces being so shaped and located that, when the shears are locked in the closed position, the tumbler is prevented from moving in the second direction, thereby to provide self-locking. At least one of the cam surfaces is sufficiently extended to allow the tumbler to move far enough in the first direction to lock shears in the closed position, and to maintain self locking, independent of wear, adjustment or manufacturing tolerance in the shears.

The invention ensures that the shears can always be locked in the fully closed position by the locking device, irrespective of manufacturing tolerances and wear occurring in operation, i.e. in the case of anvil shears locking without a light gap is always guaranteed and, in the case of twin-bladed shears, the tips of the blades are always brought into the closed position in optically precise alignment. At the same time, the arrangement is expediently such that a tumbler plate mounted pivotably on one limb of the shears interacts with a latching recess or a latching cam surface on the other limb of the shears. The interacting cam surfaces are such that, in the closing region, self-locking occurs even before the end position is reached, and further pivoting of the tumbler plate moves the limbs of the shears continuously into the end position.

The tumbler plate can be pivoted by a projection projecting beyond the handle shell. However, this would result in uncomfortable handling. According to a further refinement of the invention, a slide button which, instead of a rotary motion, describes a linear motion on the outside of the handle shell of one limb of the shears should therefore be provided for ergonomic reasons. According to the preferred exemplary embodiment of the invention, this slide button is arranged in such a way that it can be operated in a one-handed manner with the thumb of the right or left hand with which the shears are being grasped. The connection between the tumbler plate and the slide button is made by means of a pin, which is fixed by frictional engagement in a hole in the tumbler plate and engages in a guide slot in the form of an elongate hole in the slide button in such a way that the stroke motion of the pin is accommodated. The slide button can be guided in a guide track in the handle shell in a form-locking manner i.e., held together due to their respective shapes. This avoids a gap between the button and the guide track, which could easily attract dirt, which could in turn lead to jamming of the tumbler mechanism.

The slide button can be fixed by frictional engagement in the respective closed position of the shears, the self-locking of the locking elements excluding unwanted opening under the action of the opening spring. According to a preferred embodiment of the invention, however, a latching mechanism in the form of a precision latching structure is provided, thereby making it possible to fix the slide button in defined precision-matched positions relative to the handle shell guiding it. The latching arrangement is of resilient design, with the result that it is always possible to ensure latching in the end position.

BRIEF DESCRIPTION OF THE DRAWING(S)

Figure 2:
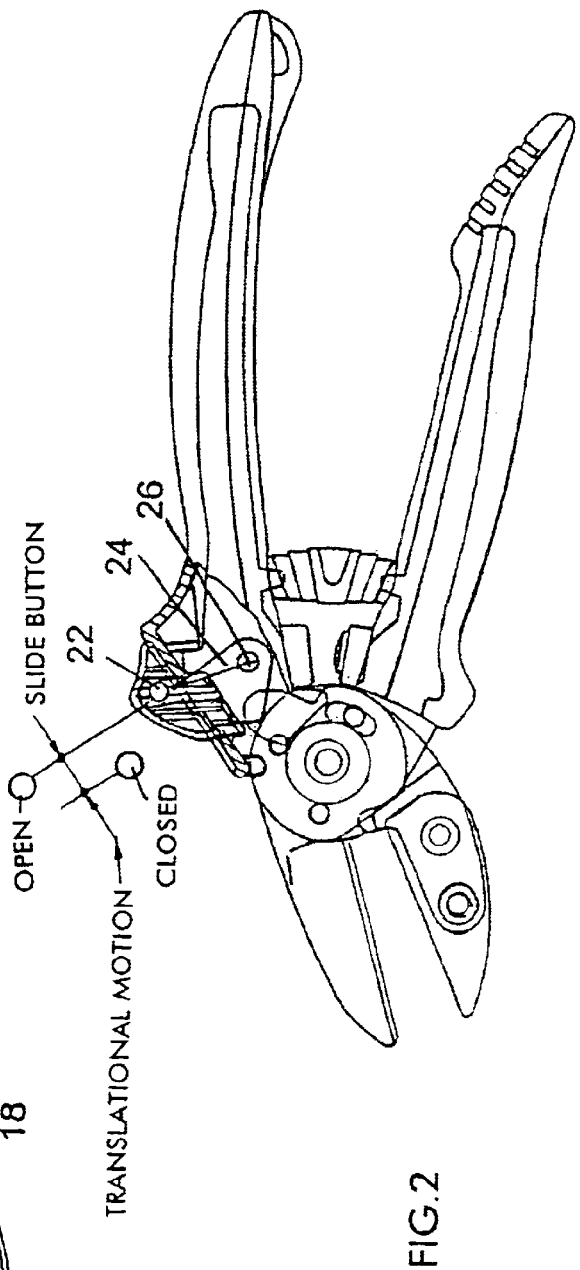
Figure 3:
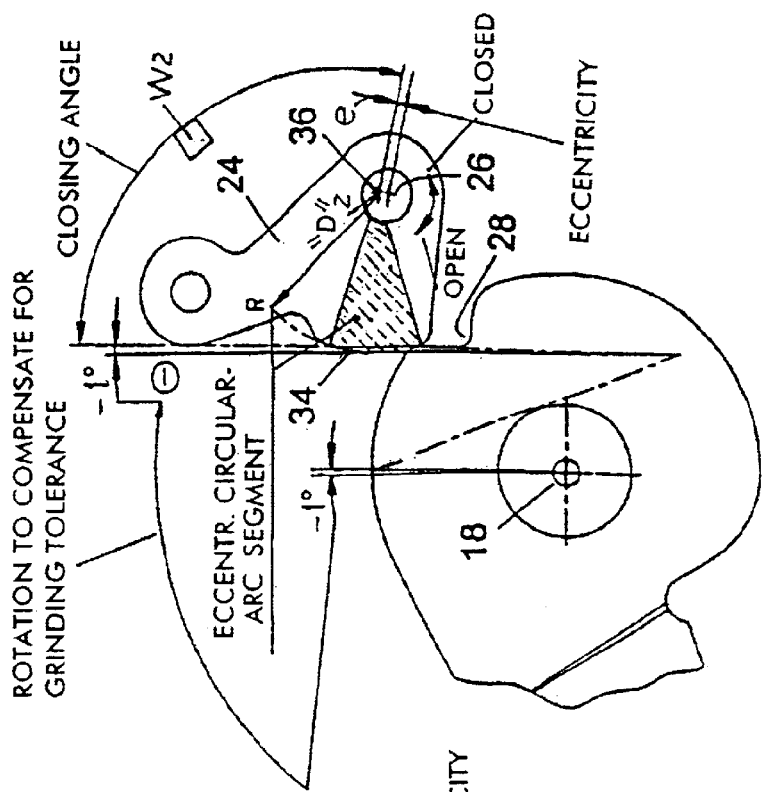
Figure 4:
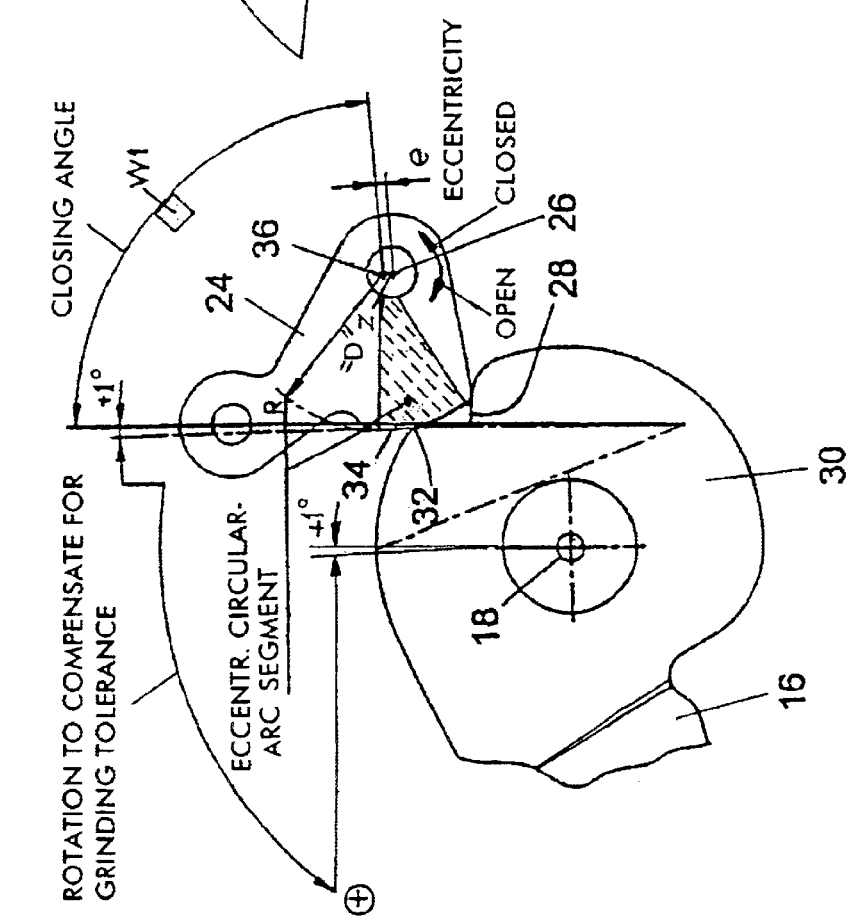
Figure 5:
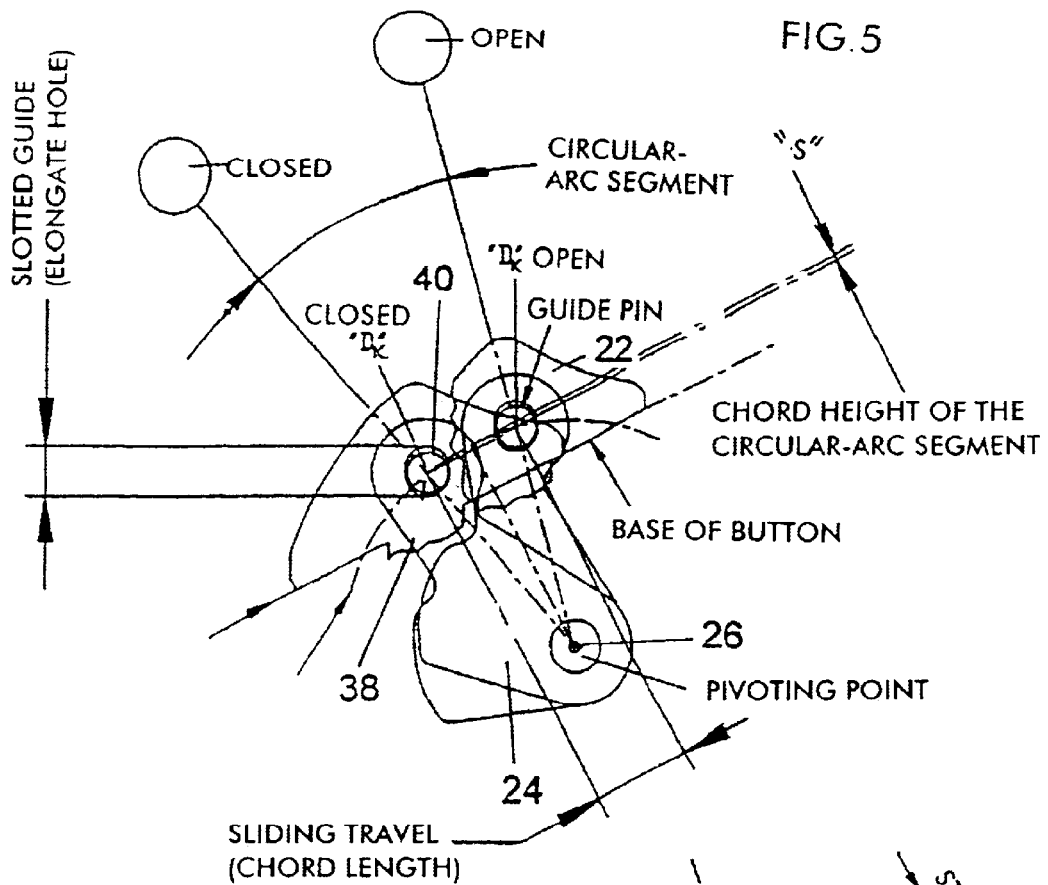
Figure 7:
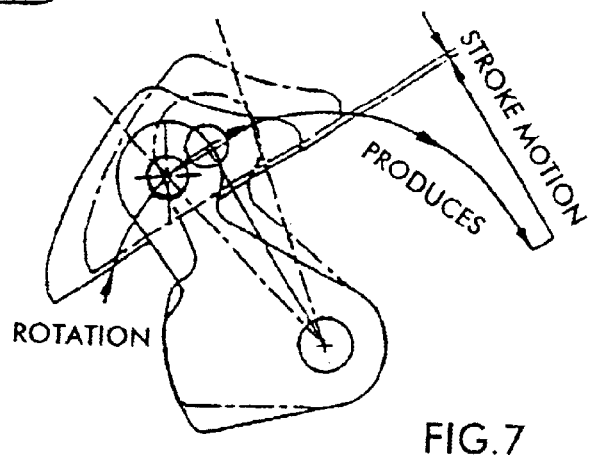
Figure 6:
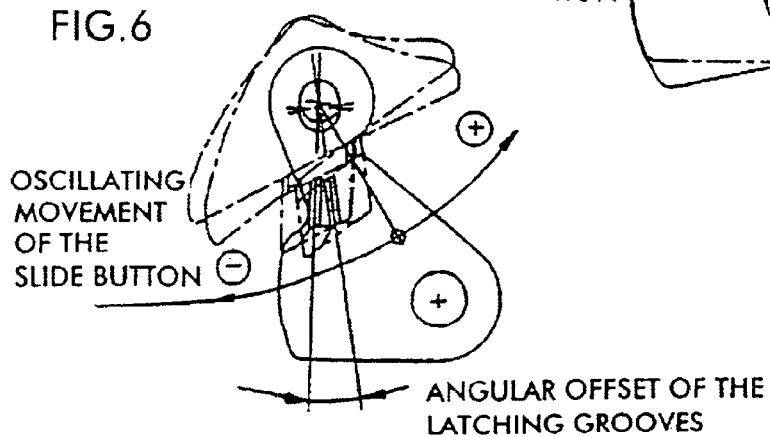
Figure 8C:
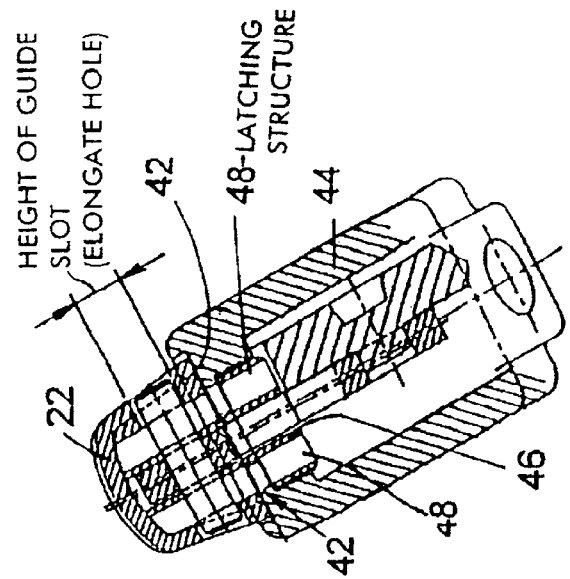
Figure 8A:
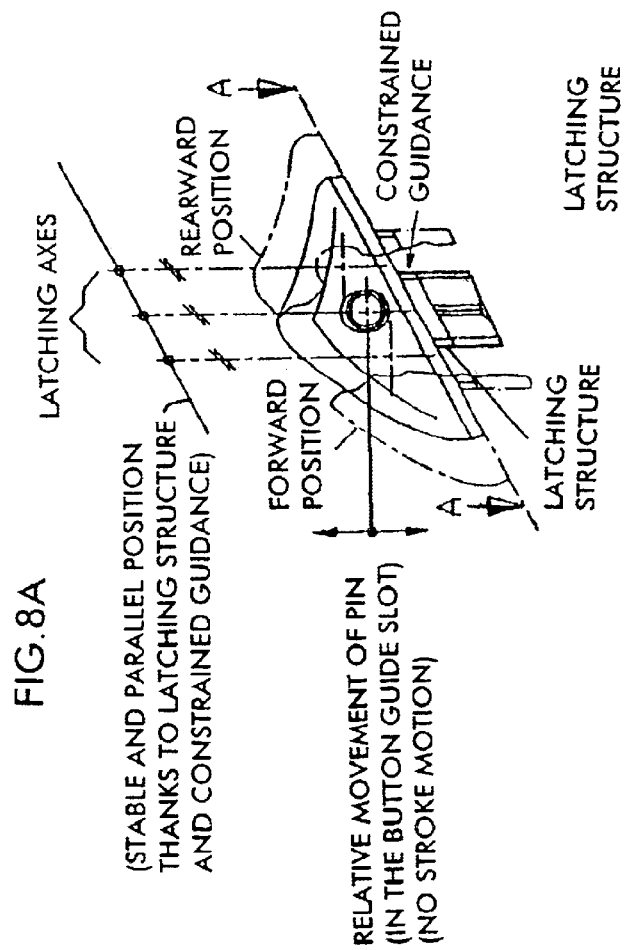
Figure 8B:
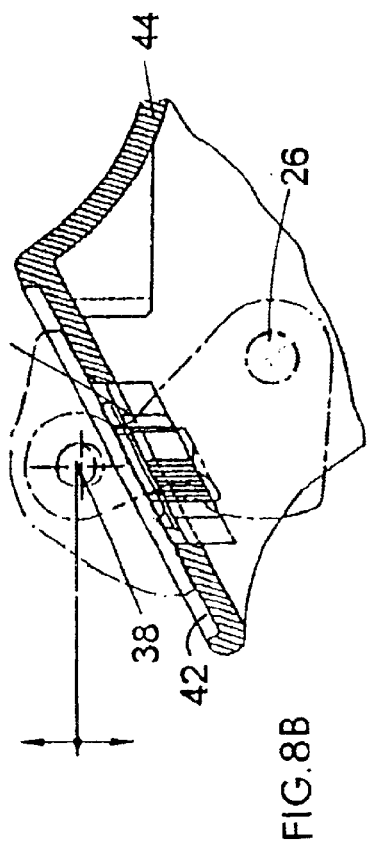
Figure 9:
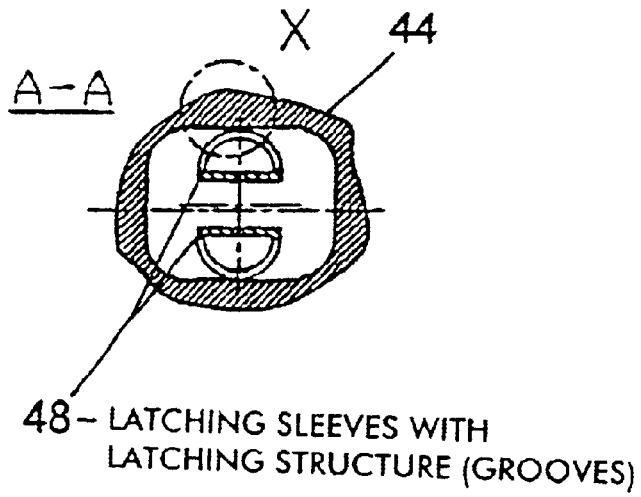
Figure 10:
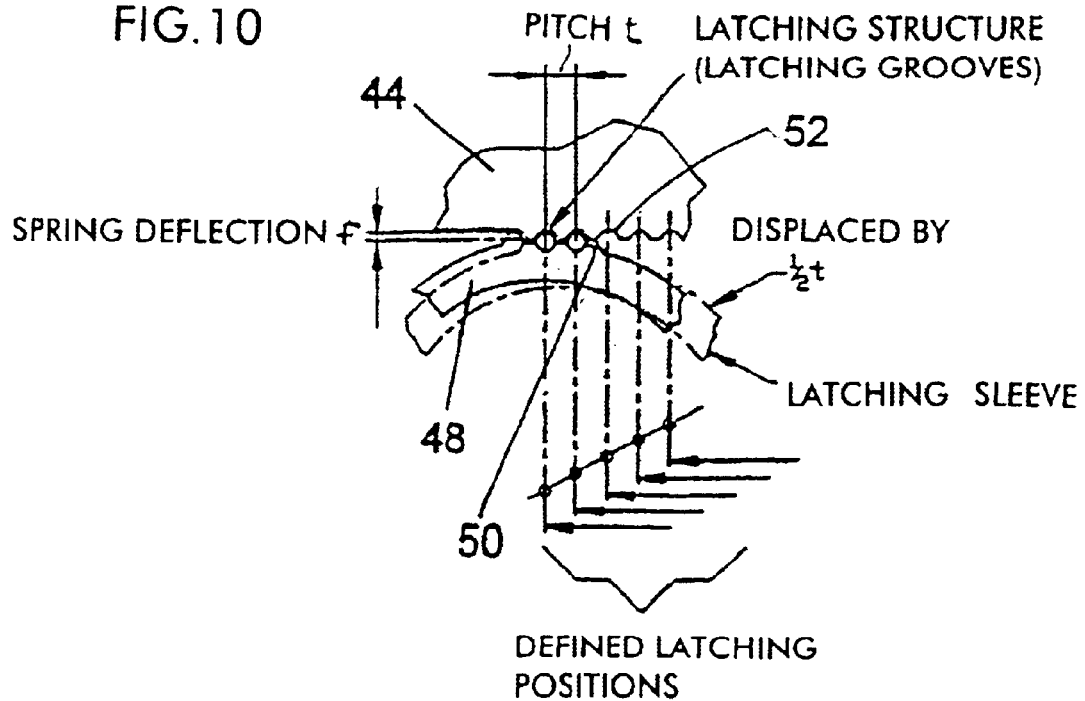

An exemplary embodiment of the invention is described below with reference to the drawing, in which:

FIG. 1 shows a view of closed anvil shears fitted with a locking device according to the invention, FIG. 2 shows a view of the shears illustrated in FIG. 1, in the open position, FIGS. 3 and 4 show the tumbler which engages on the blade of the shears, more specifically in the fully closed position in FIG. 3 and in a position just before the closed position is reached in FIG. 4, FIG. 5 shows the geometric starting position for the interaction between the slide button (with guide slot) and tumbler plate (with guide pin), FIGS. 6 and 7 show the interaction of the slide button and the tumbler plate, FIG. 8A shows a side view of the slide button, FIG. 8B shows the mounting of the slide button in the guide track, FIG. 8C shows a cross-sectional view of the slide button as mounted on the guide track, FIG. 9 is a section along the line A—A in FIG. 8, and FIG. 10 shows an arrangement of defined latching positions.

DETAILED DESCRIPTION OF PREFERRED EMBODIMENTS OF THE INVENTION

The anvil shears illustrated in FIGS. 1 and 2 have a first limb 10 with an anvil 12, arranged adjustably thereon, and a second limb 14 with a blade 16 which interacts with the anvil. The two limbs 10 and 14 of the shears are connected to one another by a hinge pin 18. An opening spring 20 arranged between the limbs 10 and 14 attempts to spread the limbs 10 and 14 apart. The shears are held in the closed position against the force of the opening spring 20 by a locking device described in detail below. This locking device has a slide button 22, which pivots a tumbler plate 24 about an axis 26. This tumbler plate interacts with a catch recess 28 in the blade 16, as can be seen most clearly from FIGS. 3 and 4. The blade 16 is mounted by its rear part 30 on the hinge pin 18, and this part 30 is riveted to the front portion of the limb 14 of the shears. This part 30 of the blade 16 bears the catch recess, which has a rounded cam surface 32 that interacts with a latching cam surface 34 of the tumbler plate 24. This latching cam surface 34 is designed in such a way that the radius increases when viewed in the clockwise direction in accordance with FIGS. 3 and 4, thereby ensuring that the shears are always held reliably in their closed position, even when grinding tolerances occur. According to the exemplary embodiment illustrated, the cam surface 32 is designed as a circular arc but its center 36 is eccentric relative to the pivoting axis 26 and, as can be seen, is offset upward, more specifically with an eccentricity e. When the limbs of the shears are pivoted relative to one another about the hinge pin 18, the position of the catch recess 28 in the blade 16, 30 relative to the tumbler plate 24 also changes. Since the region of contact with the blade is in the form of an eccentric circular-arc segment 34, it is always possible to lock the shears without a light gap. Reliable self-locking of the locking mechanism against the opening moment of the opening spring 20 is ensured by the eccentricity and position of the pivoting axis 26 of the tumbler plate 24 and in view of the position of the recess 28.

The tumbler plate 24 is pivoted about the axis 26 by the slide button 22. For ergonomic reasons, the slide button 22 should perform a linear motion instead of a rotary motion to allow the locking device to be closed and opened easily. The connection between the slide button 22 and the tumbler plate 24 is established by means of a pin 38, which is fixed in the tumbler plate 24 and travels in a slotted guide in the slide button 22, said slotted guide being designed as an elongated hole 40. This elongated hole 40 is dimensioned in such a way that the chord height of the circular-arc segment is accommodated within the angular range of the movement of the tumbler plate. The linear motion of the slide button is assured by a constraining guide 42, which is most easily seen in FIGS. 8A–8C. As can be seen from the sectional representations in FIGS. 8B and 8C, the slide button 22 slides on a sliding surface 42 of the handle shell 44 of the limb 10 of the shears. As can be seen from FIGS. 5 to 8, the fastening pin 38 acts as a guide pin which, by means of the elongated hole 40 in the slide button 22, pivots the tumbler plate 24 about the axis 26. The path described by the guide pin 38 within the elongated hole 40 corresponds to the segment height of the circular-path segment described by the axis of the pin 38 between the "OPEN" position and the "CLOSED" position. This prevents the slide button from lifting off during the sequence of motion. The slightly projecting surface of the pin 38 furthermore reduces abrasion in the slide button 22. The pin 38 also acts as a retention element to prevent loss.

The position of the slide button 22 on the sliding surface 42 of the handle shell 44 could be fixed by frictional engagement.

According to an expedient refinement of the invention, a latching mechanism is provided to fix the respective position, this latching mechanism being most clearly visible in FIGS. 9 and 10. FIG. 9 shows a section along the line A—A, while FIG. 10 shows the detail indicated by the circle X in FIG. 9 on a larger scale and more clearly. On the extension 46, which projects into a slot in the handle shell 44, there are two semicircular hollow cylinders 48, which are preloaded elastically against the inner wall of the handle shell 44. In the region which comes into contact with the inner walls of the handle shell 44, the hollow cylinders have a latching structure 50 in the form of latching grooves and latching ribs, and this latching structure interacts with a corresponding latching structure 52 on the inner wall of the handle shell, as can be seen from FIG. 10. This provides clearly defined latching positions, and the slide button 22 is prevented from being displaced unintentionally on the sliding surface 42. This latching structure results in precisely defined latching positions, thereby ensuring reliable opening and closure of the shears. As can be seen from FIGS. 8A and 8B, the latching structure 50, 52 promotes a stable position of the button, parallel to the axis, during sliding and in the rest position. The constrained guidance of the button in the slotted aperture in the handle shell 44 furthermore results in precisely defined freedom of movement for the connecting element, i.e. the pin 38.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Pruning shears comprised of:

first and second crossed pivoted limbs which carry respective cooperating cutting elements at the front ends thereof, and which extend rearwardly to form hand grips for operating the shears;

a spring that cooperates with the limbs to apply a force tending to open the shears; and a locking device, the locking device comprising:

a manually operable slide button;

a tumbler which is pivotally mounted on the first limb, and which is coupled to be moved by the slide button in a first direction to lock the shears in a closed position against the force of the spring with substantially no gap between the cutting elements, and in a second direction to a released position at which the shears may be manually opened and closed;

a first cam surface on the tumbler; and a second cam surface on the second limb that interacts pivotally with the first cam surface with no translational motion, the first and second cam surfaces being so shaped and located that, when the shears are locked in the closed position, the tumbler is prevented from moving in the second direction, thereby to provide self-locking, at least one of the cam surfaces being shaped and dimensioned to allow the tumbler to move far enough in the first direction to lock the shears in the closed position, and to maintain self locking, independent of wear, adjustment or manufacturing tolerance in the shears.

2. The pruning shears as claimed in claim 1, wherein:

the second cam surface forms a catch recess in the second limb; and the dimensions and shape of the cam surface on the tumbler is such that the tumbler can be pivoted far enough that a first portion thereof engages the catch recess in a first region that assures closure of the shears with substantially no gap between the cutting elements, and a second portion thereof engages the catch recess in a second region which prevents the spring from forcing the shears to open.

3. The pruning shears as claimed in claim 2, wherein the second portion of the cam surfaces engages the catch recess in the second region before the first portion of the cam surface engages the catch recess in the first region.

4. The pruning shears as claimed in claim 2, wherein the first cam surface on the tumbler is in the form of a circular arc, the center of which is located eccentrically relative to the point at which the tumbler is pivotally mounted.

5. The pruning shears as claimed in claim 1, wherein the slide button is movably attached to a projection on the tumbler that extends outwardly through a slot in the first limb, whereby the tumbler is rotatable about its pivotal mounting as the slide button executes linear motion.

6. The pruning shears as claimed in claim 5, wherein the slide button is coupled to the tumbler by a pin which is mounted on the tumbler projection and which extends into an elongated hole in the slide button.

7. The pruning shears as claimed in claim 5, further including a guide track surrounding the slot in the first limb, and wherein the slide button is mounted for linear movement in the guide track in a form-locking manner.

8. The pruning shears as claimed in claim 1, further including a latching mechanism for the slide button which defines a plurality of latching positions for the slide button along its path of motion.

9. The pruning shears as claimed in claim 8, wherein:

the slide button moves linearly along a guide track on the first limb, on an extension projecting into the guide track; and the slide button latching mechanism is comprised of a plurality of elastic, hollow-cylindrical latching sleeves which interact with a complementary structure on the guide track.

10. The pruning shears as claimed in claim 9, wherein the complementary structure comprises latching grooves and latching ribs arranged in wave form.

* * * * *